United States Patent
Zeng

(10) Patent No.: US 12,427,659 B2
(45) Date of Patent: Sep. 30, 2025

(54) TRANSPORTER NETWORK FOR DETERMINING ROBOT ACTIONS

(71) Applicant: Google LLC, Mountain View, CA (US)

(72) Inventor: Andy Zeng, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 263 days.

(21) Appl. No.: 18/011,561

(22) PCT Filed: Oct. 15, 2020

(86) PCT No.: PCT/US2020/055726
§ 371 (c)(1),
(2) Date: Dec. 20, 2022

(87) PCT Pub. No.: WO2022/081157
PCT Pub. Date: Apr. 21, 2022

(65) Prior Publication Data
US 2023/0256597 A1    Aug. 17, 2023

(51) Int. Cl.
*B25J 9/16* (2006.01)
*B25J 19/02* (2006.01)

(52) U.S. Cl.
CPC ........... *B25J 9/163* (2013.01); *B25J 9/161* (2013.01); *B25J 9/1697* (2013.01); *B25J 19/022* (2013.01)

(58) Field of Classification Search
CPC . B25J 9/163; B25J 9/161; B25J 9/1697; B25J 19/022; G06F 18/24133; G06F 18/2415; G06N 3/045; G06V 2201/12; G06V 20/10; G06V 20/64; G05B 2219/40532
See application file for complete search history.

(56) References Cited

U.S. PATENT DOCUMENTS

| | | |
|---|---|---|
| 11,740,724 B2 | 8/2023 | Lin et al. |
| 2017/0084027 A1* | 3/2017 | Mintz ............... A61B 1/00147 |
| 2019/0196436 A1* | 6/2019 | Nagarajan ............... B25J 9/163 |

(Continued)

FOREIGN PATENT DOCUMENTS

WO    WO 2020/113027    6/2020

OTHER PUBLICATIONS

Coline Devin, Payam Rowghanian, Chris Vigorito, Will Richards, Khashayar Rohanimanesh "Self-Supervised Goal-Conditioned Pick and Place". Aug. 2020 arXiv:2008.11466 (Year: 2020).*

(Continued)

*Primary Examiner* — Abby Y Lin
*Assistant Examiner* — Danielle M Jackson
(74) *Attorney, Agent, or Firm* — DORITY & MANNING P.A.

(57) ABSTRACT

A transporter network for determining robot actions based on sensor feedback can afford robots with efficient autonomous movement. The transporter network may exploit spatial symmetries and may not need assumptions of objectness to provide accurate instructions on object manipulation. The machine-learned model of the transporter network may also allow for learning various tasks with less training examples than other machinelearned models. The machine-learned model of the transporter network may intake observation data as input and may output actions in response to the processed observation data.

20 Claims, 9 Drawing Sheets

(56) References Cited

U.S. PATENT DOCUMENTS

| | | | |
|---|---|---|---|
| 2021/0012116 A1* | 1/2021 | Urtasun | G06F 18/2155 |
| 2021/0089958 A1* | 3/2021 | Theocharous | G06N 5/045 |
| 2021/0205988 A1* | 7/2021 | James | B25J 9/163 |
| 2021/0379757 A1* | 12/2021 | Schneider | G05D 1/0293 |

OTHER PUBLICATIONS

Lars Berscheid, Pascal Meißner, Torsten Kröger. "Self-supervised Learning for Precise Pick-and-place without Object Model". Jun. 2020 arXiv:2006.08373 (Year: 2020).*

International Preliminary Report on Patentability for Application No. PCT/US2020/055726, mailed Apr. 27, 2023, 9 pages.

Berscheid et al, "Self-Supervised Learning for Precise Pick-and-Place without Object Model", Robotics and Automation Letters, vol. 5, No. 3, Jul. 2020, 8 pages.

Devin et al, "Self-Supervised Goal-Conditioned Pick and Place", arXiv:2008.11466vl, Aug. 26, 2020, 6 pages.

International Search Report for Application No. PCT/ US2020/055726, mailed on Jul. 16, 2021, 3 pages.

Chinese Search Report Corresponding to Application No. 202080102599.3 on Sep. 9, 2024.

* cited by examiner

TRANSPORTER NETWORK FOR DETERMINING ROBOT ACTIONS

CROSS-REFERENCE TO RELATED APPLICATIONS

The present application is based upon and claims the right of priority under 35 U.S.C. § 371 to International Application No. PCT/US2020/055726 filed on Oct. 15, 2020, which is incorporated by reference herein.

FIELD

The present disclosure relates generally to robot operation. More particularly, the present disclosure relates to the use of machine learning to determine robot actions.

BACKGROUND

The field of robotics includes the design, construction, operation, and application of robots, as well as computer systems for their control, sensory feedback, and information processing. In many cases, robotic manipulation or control planning can be formulated as inducing a sequence of spatial displacements: where the space being moved can encompass one or more objects or the end effector (e.g., the robot being controlled).

Machine learning techniques have been shown to be particularly advantageous for robotic manipulation or other forms of robotic control planning. For example, machine learning techniques such as end-to-end models that map directly from pixels to robotic actions hold the capacity to learn complex manipulation skills. However, existing models which map directly from pixels to robotic actions are known to require copious amounts of data and therefore are difficult to apply in situations where little to no training data is available, or training data is challenging or expensive to obtain.

As an alternative approach, some machine learning approaches for robotic manipulation integrate object-centric assumptions (e.g., object key points, embeddings, or dense descriptors) about objects within the scene. This object-centric approach has been shown to improve sample efficiency. However, these object representations often impose data collection burdens and still struggle to address challenging scenarios with unseen classes of objects, occluded objects, highly deformable objects, or piles of small objects. The large amount of data collection required can slow down the processing and can be a computational burden. Furthermore, the robustness of the model can be debilitated by rigidness of the representational constraints.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for generating actions for robots. A computer-implemented method for generating actions for robots can include obtaining observation data, in which the observation data includes data descriptive of an environment. The computer-implemented method can include determining a first action for a robot based at least in part on the observation data and processing the observation data with a first embedding model to generate a first feature embedding. The computer-implemented method can include processing the observation data with a second embedding model to generate a second feature embedding, in which the second embedding model is conditioned upon the first action. The computer-implemented method can include determining, based at least in part on a comparison of the first feature embedding with the second feature embedding, a second action for the robot.

Another example aspect of the present disclosure is directed to a computer system. A computer system may include one or more processors and one or more non-transitory computer readable media that collectively store instructions that, when executed by the one or more processors, cause the computing system to perform operations. The operations may include obtaining observation data, in which the observation data includes data descriptive of an environment. The operations may include determining a first action for a robot and processing the observation data with a first embedding model to generate a first feature embedding. In some implementations, the operations may include processing the observation data with a second embedding model to generate a second feature embedding, in which the second embedding model is conditioned upon the first action. The operations may include determining, based at least in part on a comparison of the first feature embedding with the second feature embedding, a second action for the robot. The operations may include evaluating a loss function that compares one or both of the first action and the second action to one or both of a first ground truth action and a second ground truth action, and modifying one or more values of one or more parameters of one or both of the first embedding model and the second embedding model based at least in part on the loss function.

Another example aspect of the present disclosure is directed to a robotic device. A robotic device may include one or more non-transitory computer-readable media that collectively store instructions that, when executed by one or more computing devices, cause the one or more computing devices to perform operations. In some implementations, the operations include obtaining observation data, in which the observation data includes data descriptive of an environment. The operations may include determining a first action for the robotic device and processing the observation data with a first embedding model to generate a first feature embedding. The operations may include processing the observation data with a second embedding model to generate a second feature embedding, in which the second embedding model is conditioned upon the first action. The operations may include determining, based at least in part on a comparison of the first feature embedding with the second feature embedding, a second action for the robotic device. The operations may further include performing, by the robotic device, the first action and the second action.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
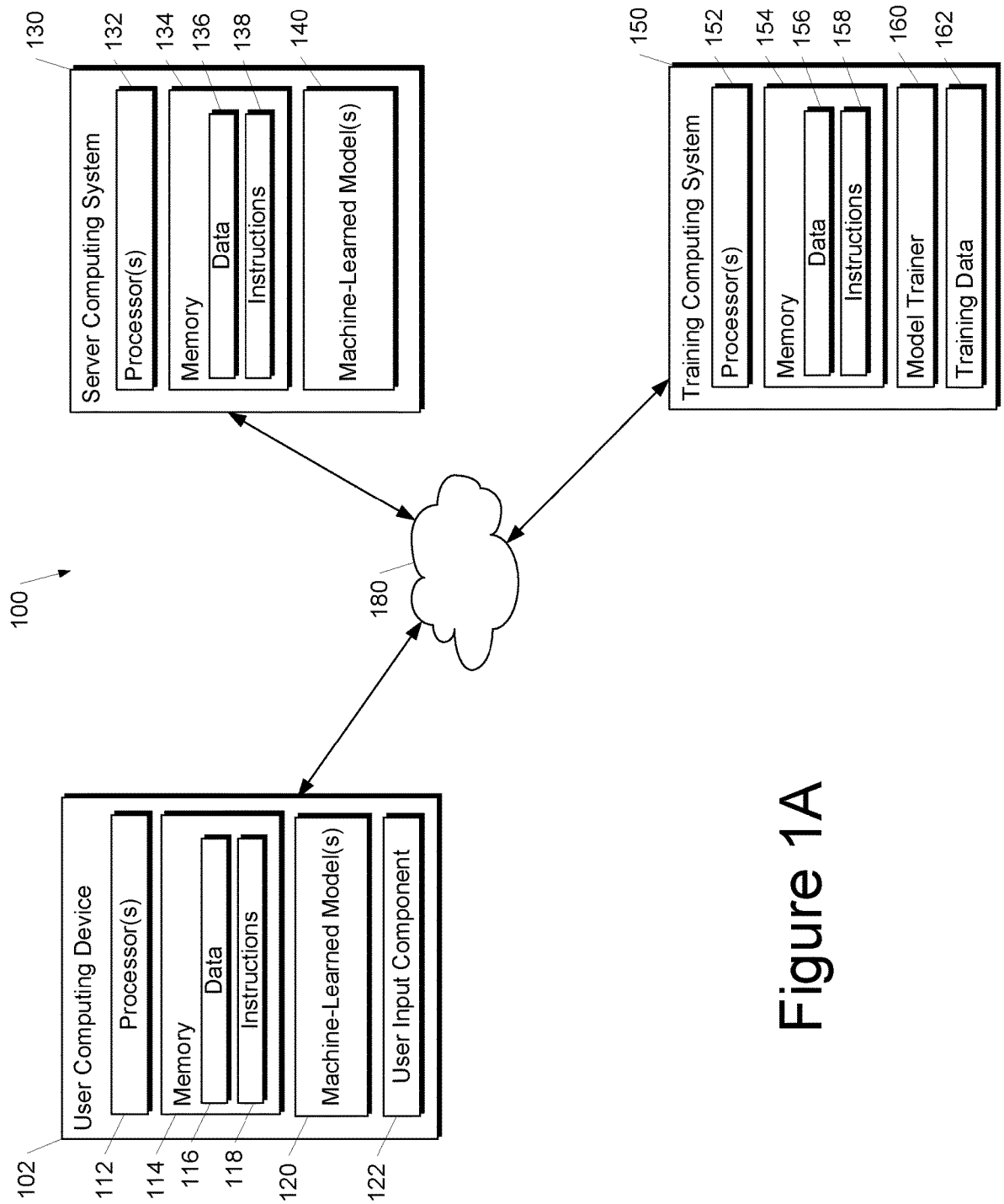
FIG. 1A depicts a block diagram of an example computing system according to example embodiments of the present disclosure.

Reference numerals that are repeated across plural figures are intended to identify the same features in various implementations.

DETAILED DESCRIPTION

Overview

Generally, the present disclosure describes systems and methods for determining actions for robots based on observations of an environment such as images of the environment. In particular, systems and methods proposed herein can leverage an end-to-end machine-learned transporter network that can learn to infer robot actions from observation data such as visual inputs. In particular, the system can utilize deep feature template matching to infer spatial displacements from visual input—which can parameterize robot actions. The proposed models avoid reliance upon assumptions of objectness (e.g., canonical poses, models, or keypoints), exploit spatial symmetries, and are orders of magnitude more sample efficient than example benchmarked alternatives in learning vision-based manipulation tasks: from stacking a pyramid of blocks to assembling kits with unseen objects; from manipulating deformable ropes to pushing piles of small objects with closed-loop feedback. The proposed systems and methods can represent complex multi-modal policy distributions and generalize to multi-step sequential tasks, as well as 6 DoF tasks such as 6 DoF pick-and-place. Experiments on various simulated tasks show that the proposed models learn faster and generalize better than a variety of end-to-end baselines, including policies that use ground-truth object poses.

Thus, aspects of the present disclosure are directed to an end-to-end model architecture (e.g., which can be referred to as a "transporter network") that preserves spatial structure for vision-based manipulation, without object-centric assumptions. The proposed models and associated systems provide improved learning efficiency relative to existing pixel-based approaches, but without imposing any of the limitations or burdens of explicit object representations.

In particular, manipulation often involves rearranging things, which can be thought of as executing a sequence of spatial displacements: where the space being moved (e.g., transported) can encompass an object or end effector. The proposed approaches can formulate vision for manipulation as estimating these displacements. Transporter networks can directly optimize for this by learning to attend to a local region and predict its target spatial displacement via deep feature template matching—which then parameterizes robot actions for manipulation. This formulation enables high-level perceptual reasoning about which visual cues are important, and how they should be rearranged in a scene—the distributions of which can be learned from demonstrations.

Example transporter networks can also preserve the 3D spatial structure of the visual input. For example, prior end-to-end models often use convolutional architectures with raw images, in which valuable spatial information can be lost to perspective distortions. Example implementations of the proposed methods use 3D information to project visual data onto a spatially-consistent representation, with which it is able to better exploit equivariance for inductive biases that are present within the symmetries of the data for more efficient learning.

Example implementations of the proposed transporter networks have experimentally demonstrated superior sample efficiency on a number of tabletop manipulation tasks that involve changing the state of the robot's environment in a purposeful manner: from stacking a pyramid of blocks, to assembling kits with unseen objects; from manipulating deformable ropes, to pushing piles of small objects with closed-loop feedback. Transporter networks also excel in modeling multi-modal spatial action distributions, and by construction generalize across rotations and translations of objects. They do not require any prior knowledge of the objects to be manipulated—operating instead based on information contained within partial visual data (e.g., RGB-D data) from a few demonstrations, and are capable of generalizing to new objects and configurations, and for some tasks, one-shot learning from a single demonstration.

Thus, example aspects of the present disclosure leverage a new perspective on the role of spatial structure and its capacity to improve end-to-end learning for vision-based manipulation. Example model architectures are provided that learn to attend to a local region and predict its spatial displacement, while retaining the spatial structure of the visual input.

More particularly, example systems and methods for performing robotic control can first obtain observation data. The observation data can include data descriptive of an environment. The observation data can be image data (e.g., RGB data or the like). Additionally or alternatively, the observation data can be Light Detection and Ranging (LiDAR) point cloud data.

As described above, some example implementations can pre-process the observation to ensure spatial consistency. For example, a robotic control system can unproject the raw observation data into three-dimensional space and then render the unprojected data into an orthographic representation of the environment to generate the spatially consistent observation data.

The robotic control system can process the observation data to determine a first action for a robot. For example, determining a first action can include generating a first probability distribution for the first action based on the observation data by using a first machine-learned action value model (e.g., which is a portion of a larger transporter network). The first action determination can also involve selecting a maximum value of the first probability distribution as the first action. The first action can be a change in the pose of the robot and/or to come in contact with an object. The first probability distribution can include one or more points indicating a respective probability that the one or more points can be a start location for an object manipulation.

The robotic control system can also process the observation data with a first embedding model to generate a first feature embedding. For example, the first embedding model can be a portion of a larger transporter network. The system can also process the observation data with a second embedding model to generate a second feature embedding (again, the second embedding model can be a portion of a larger transporter network).

In some embodiments, the second embedding model is conditioned upon the first action. In particular, in some implementations, processing the observation data with the second embedding model can include rotating and/or cropping the observation data (e.g., in a local region around a location associated with the first action) to generate a plurality of rotated cropped data samples. In such implementations, processing of the observation data with the second embedding model can include respectively processing the plurality of rotated cropped data samples with the second embedding model to respectively generate a plurality of second feature embeddings. In some implementations, each of the first embedding model and the second embedding model can be or include a fully convolutional neural network.

The robotic control system can then determine a second action for the robot. The determination of the second action can, in some implementations, be partially dependent on a comparison of the first feature embedding and the second feature embedding(s).

As one example, the comparison can be or include a convolution of the two feature embeddings. The convolution can include convolving each of the second feature embedding(s) over the first feature embedding to generate a respective second probability distribution.

As another example, in more complex implementations, rather than simply convolving the first and second feature embedding(s), the determination of the second action can include processing the first feature embedding and the second feature embedding(s) with a second machine-learned value action model (e.g., which again may be part of the larger transporter network). The second machine-learned value action model can output one or more second probability distributions based on the feature embedding(s).

The determination of the second action can include selecting a maximum value of the second probability distribution(s) as the second action. In some cases, the second action can be a second pose of the robot and/or to release contact with an object. Thus, the second probability distribution(s) can include one or more points indicating a respective probability that the one or more points can be a stop location for an object manipulation.

In some implementations, the robotic control system can further obtain a set of goal image data, process the goal image data with a third embedding model to generate a third feature embedding, and determine the second, and/or first, action based on feature embeddings from all three embedding models.

Additional aspects of the present disclosure can include training steps for training the transporter network (e.g., its constituent models) for action determination. The training steps can include evaluating a loss function that compares the first action and the second action to a first ground truth action and a second ground truth action. In response to the evaluation step, the values of the parameters of the embedding models and/or the action value model(s) can be modified based on the loss function (e.g., in an end-to-end manner).

In some implementations, evaluating the loss function can include generating a first one-hot ground truth pixel map based on the first ground truth action and generating a second one-hot ground truth pixel map based on the second ground truth action. The first one-hot ground truth pixel map can include a first plurality of pixels that have respective binary values that indicate a ground truth location for the first action within the environment. Moreover, the second one-hot ground truth pixel map can include a second plurality of pixels that have respective binary values that indicate a ground truth location for the second action within the environment. The first action and second action determined by the transporter network (e.g., their respective locations) can then be compared to the first one-hot ground truth pixel map and the second ground truth pixel map, respectively.

In some implementations, the loss function can be or include a cross entropy loss. The cross entropy loss can compare the first action and the second action against the first one-hot ground truth pixel map and the second one-hot ground truth pixel map, respectively. Specifically, the comparison can be evaluated on a pixel by pixel basis.

Thus, the system and methods provided herein can be implemented as a simple end-to-end model architecture that preserves spatial structure for vision-based manipulation, without object-centric assumptions. The vision-based manipulations can include executing a sequence of spatial displacements. The manipulations can move an object or an end effector. The network's system can involve a system of visual-feedback to determine the spatial displacements and the sequence of the spatial displacements. The system can learn to attend to a local region and predict target spatial displacement through deep feature template matching. The deep feature template matching can use observational data to determine a first pose and a second pose based on processed observation data. The deep feature template matching can then enable the determination of robot actions for manipulation.

The systems and methods of the present disclosure provide a number of technical effects and benefits. As one example, the system and methods can provide for more efficient action determination for a robot and therefore, increase robot productivity. Furthermore, the systems and methods can decrease data collection burdens and can decrease the computing power needed for computation. As the systems and methods can make action determinations without the need for object key points, embeddings, or dense descriptors, the system or method can reduce the needed intake data. The reduction can lessen the computing power needed by the system.

Another technical benefit of the systems and methods of the present disclosure is the ability to provide improved performance after only a small number of training examples or demonstrations. The systems and methods can be trained with less examples than previous models, which allows the systems and methods to learn faster than other models. The faster learning can lead to a conservation of computing resources. Moreover, training the model on less training examples can in effect lead to a lesser usage of computing resources (e.g., processor memory, etc.), and therefore by enabling the model to learn using fewer training examples the systems and methods are conserving computing resources.

Further, the systems and methods can be used iteratively to complete sequences of tasks. The learned models can efficiently determine actions that adjust for multi-modal tasks. The ability to efficiently deal with multi-modal tasks can further increase robot productivity.

With reference now to the Figures, example embodiments of the present disclosure will be discussed in further detail.

Example Devices and Systems

FIG. 1A depicts a block diagram of an example computing system 100 that performs action determination based on sensor feedback according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more action determination models 120. For example, the action determination models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example action determination models 120 are discussed with reference to FIGS. 2, 4, 5, and 6.

In some implementations, the one or more action determination models 120 can be received from the server computing system 130 over network 180, stored in the user computing device memory 114, and then used or otherwise implemented by the one or more processors 112. In some implementations, the user computing device 102 can implement multiple parallel instances of a single action determination model 120.

More particularly, the action determination model can intake sensor data and output actions for a robot. The action determination model may be used to determine actions for a robot including, but not limited to, pick-and-place actions, push actions, drag actions, and sequence actions.

Additionally or alternatively, one or more action determination models 140 can be included in or otherwise stored and implemented by the server computing system 130 that communicates with the user computing device 102 according to a client-server relationship. For example, the action determination models 140 can be implemented by the server computing system 140 as a portion of a web service (e.g., a robot manipulation service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned action determination models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2, 4, 5, and 6.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the action determination models 120 and/or 140 based on a set of training data 162. The training data 162 can include, for example, a set of ground truth actions. The training method may include parameterization based on a comparison of determined actions against ground-truth actions. The ground-truth data may be one-hot ground-truth pixel maps.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
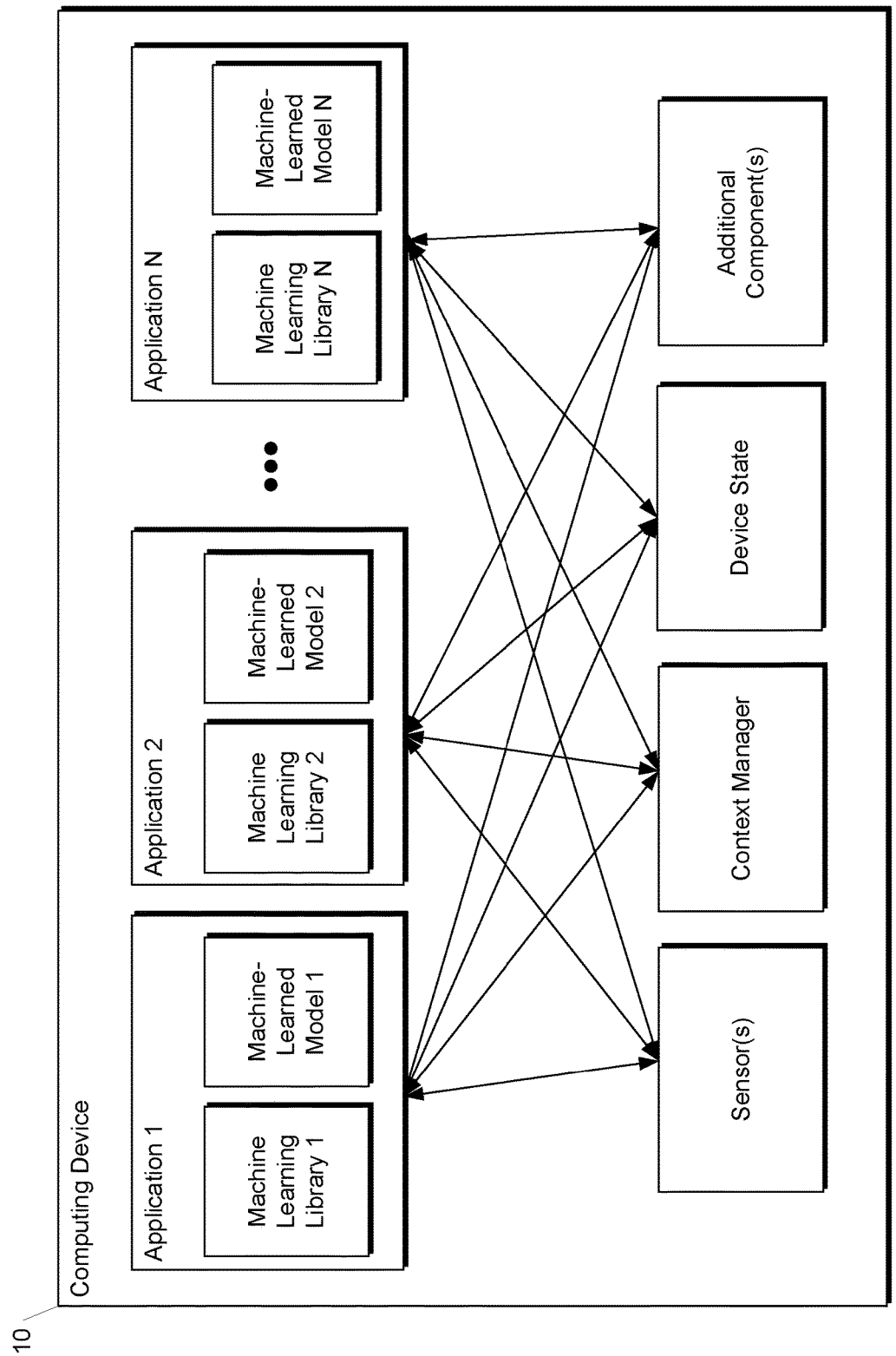
FIG. 1B depicts a block diagram of an example computing device according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
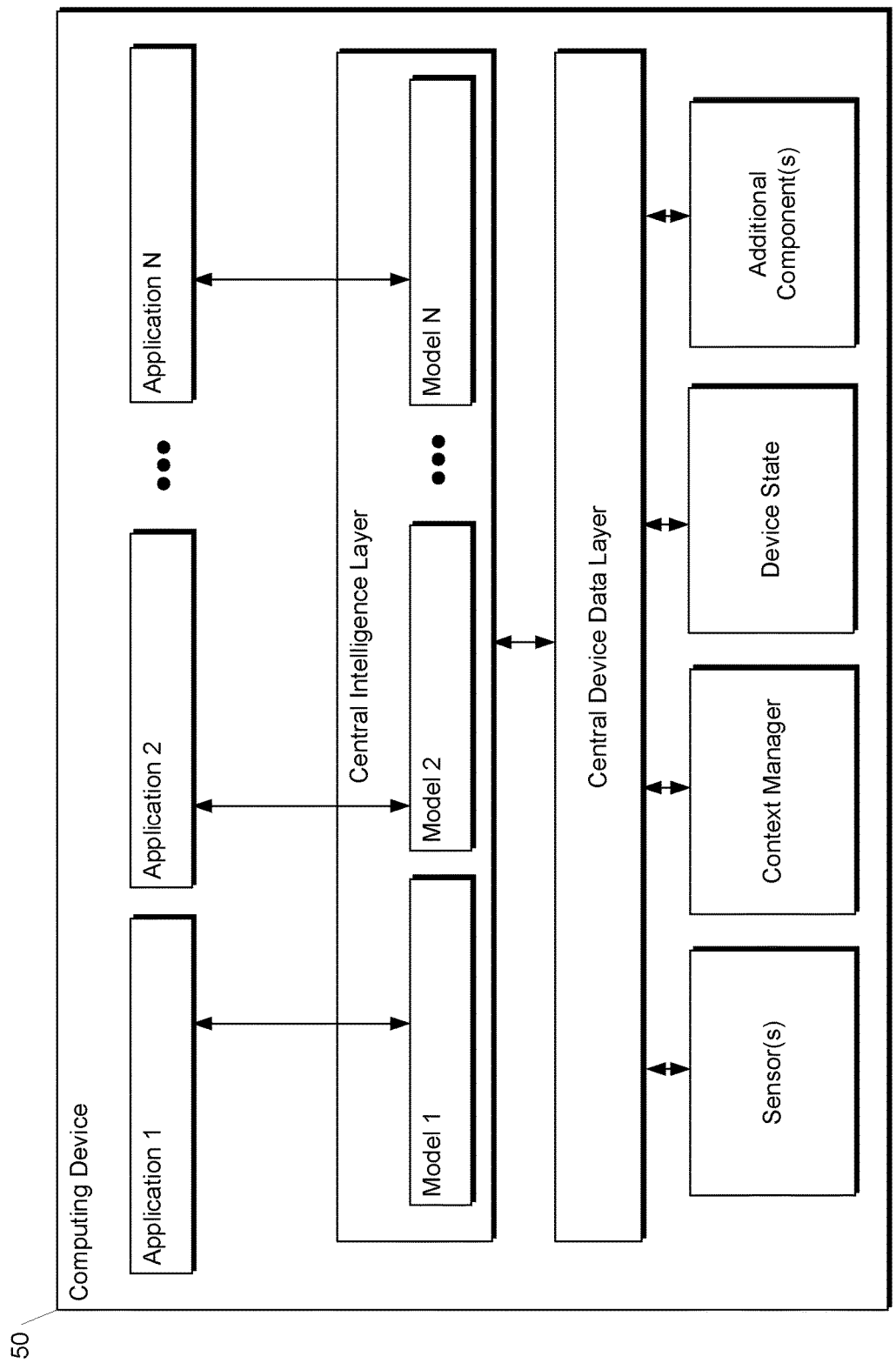
FIG. 1C depicts a block diagram of an example computing system according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Implementations

Spatial inaccuracies can occur through data intake generating perceptional distortion. The transporter network system can preserve the three-dimensional spatial structure of the visual input. The system can use three-dimensional information to project visual data onto a spatially-consistent representation. The spatially-consistent representation can allow for the exploitation of equivariance for inductive biases that are present within the symmetries of the data for more efficient learning.

The system can be utilized to learn a variety of tasks. One such task can be a pick-and-place action (e.g., the example in FIG. 2). Learning pick-and-place actions at with a robot from visual observations $o_t$ can be denoted as $f(o_t) \rightarrow a_t = ( \mathcal{T}_{pick}, \mathcal{T}_{place} ) \in \mathcal{A}$, where $\mathcal{T}_{pick}$ is the pose of the end effector used to pick an object, and $\mathcal{T}_{place}$ is the pose of the end effector used to place the object. Both poses can be defined in two-dimensional representations or three-dimensional representations, depending on the task and degrees of freedom available to the end effector. Both actions can be dependent on the observation data being processed by the action model and the embedding models. The place action can also be denoted as being reliant on the place action, such that:

$$f_{pick}(o_t) \rightarrow \mathcal{T}_{pick} f_{place}(o_t | \mathcal{T}_{pick}) \rightarrow \mathcal{T}_{place}$$

In this representation, the first pose of the robot, or the pick pose, is dependent on the visual observation $o_t$. Once the first pose is determined, the second pose of the robot, or the place pose, can be determined based on the visual observation $o_t$ and the determined first pose $\mathcal{T}_{pick}$.

The system as explained through the process of learning a pick-and-place action can be understood as (i) there being a distribution of successful pick poses 208, from which $\mathcal{T}_{pick}$ can be sampled, and (ii) for each successful pick pose, there is a corresponding distribution of successful place poses 220, from which $\mathcal{T}_{place}$ can be sampled.

The system can recover the successful pick and successful place distributions from visual observations 206 without assumptions of objectness. Avoiding object-centric representations can allow the system the capacity to handle unseen objects, deformable objects, and uncountable piles of small objects.

The equation can be generalized beyond pick-and-place actions to other motion primitives that can also be parameterized by two end effector poses (i.e. an initial action pose and a final action pose). While the above equation focuses on two-pose primitives, the same approach could generally apply to longer sequences of pose changes { $\mathcal{T}_{00}$, $\mathcal{T}_{01}$, $\mathcal{T}_{02}$, ... }. In general, there may be a plurality of pose changes in the sequence.

Furthermore, the visual observation $o_t$ 206 can be a projection of the scene (e.g., in the form of RGB-D images), defined on a regular grid of pixels $\{(u, v)\}$ at timestep t of a sequential rearrangement task. Through camera-to-robot calibration, the system can correspond each pixel in $o_t$ to a picking action at that location: $\mathcal{T}_{pick} \sim (u, v) \in o_t$. The distribution of successful picks 208 over pixels in $o_t$ can be multi-modal in nature. Multi-modal distributions can be more prevalent in cases when there are multiple instances of the same object in the scene, or when there are symmetries in the shapes of objects. The system can use various types of models. In some implementations, the system can use fully convolutional networks to model an action-value function $Q_{pick}((u,v)|o_t)$ that correlates with picking success:

$$\mathcal{T}_{pick} = \underset{(u,v)}{\mathrm{argmax}} Q_{pick}((u, v) | o_t)$$

The chosen neural network can provide equivariance such that if an object to be picked in the scene is translated, then the picking pose also translates. The equivariance can be characterized as $f_{pick}(g°o_t) = g°f_{pick}(o_t)$, where g is a translation. Spatial equivariance can improve learning efficiency for vision-based picking.

The system or method can convert RGB-D images into a spatially consistent form by unprojecting to a three-dimensional point cloud. The system can then render the three-dimensional point cloud into an orthographic projection, in which each pixel (u, v) represents a fixed window of three-dimensional space. The system can use this spatially consistent representation for the transport operation.

Spatially consistent visual representations can enable the system to perform visuo-spatial transporting. The transporting can include dense pixel-wise features from a partial crop $o_t[\mathcal{T}_{pick}]$ being rigidly transformed, then overlaid on top of another partial crop $o_t[\Delta\tau]$, where $o_t$ is the observation before the pick and $\Delta\tau$ is the relative transform from the pick pose. In some implementations, the system can involve a partial crop of the environment being overlaid on top of a second partial crop to determine an action for the robot.

For example, $o_t[\mathcal{T}_{pick}]$ can be a partial crop from $o_t$ centered on $\mathcal{T}_{pick}$. The goal of the system can be to transport the query densely to a set of poses $\{\Delta\tau_i\}$ to search for the best placement, (i.e. the $o_t[\Delta\tau_i]$ with the highest feature correlation). The system can formulate the query as a template matching problem, using cross-correlation with dense feature embeddings $\psi(\cdot)$ and $\phi(\cdot)$ (e.g., the first and second feature embeddings) from two deep models:

$$Q_{place}(\Delta\tau | o_t, \mathcal{T}_{pick}) = \psi(o_t[\mathcal{T}_{pick}]) * \phi(o_t)[\Delta\tau],$$

$$\mathcal{T}_{place} = \underset{\{\Delta\tau_i\}}{\mathrm{argmax}} Q_{place}(\Delta\tau_i | o_t, \mathcal{T}_{pick})$$

where $Q_{place}(\Delta\tau | o_t, \mathcal{T}_{pick})$ can be an action-value function that correlates with placing success, and $\Delta\tau$ can cover the space of all possible placing poses. The space of all possible placing poses can be equivalent to the space of two-dimensional translations across $o_t$ in some implementations. The structure of dense features $\psi(o_t)$ and $\phi(o_t)$ can be spatially consistent following the spatial consistency of the observation data.

The system or method can be invariant to $\mathcal{T}_{pick}$ as long as cross-correlation from relative transform $\Delta\tau$ produces the desired imagined overlay. The invariant nature can enable learning pick-conditioned placing from a small sample of demonstrations, without having to train over all possible picks.

In two-dimensional planar applications, $\mathcal{T}_{pick}$ and $\mathcal{T}_{place}$ can represent rotations along with the overlay translation. For a two-dimensional planar example embodiment, the system can discretize the space of two-dimensional planar rotations into k bins, then can rotate the input visual observation $o_t$ for each bin. $o_t$ can thereby be defined on a grid of voxels $\{(u, v, w)_i\}$ where w lies on the k-discretized axis of rotations, and $\mathcal{T}_{pick}$ and $\mathcal{T}_{place}$ can be represented discretely on this grid for two-dimensional rigid transformations. The system can achieve these steps by running a fully convolutional neural network k times in parallel, once for each rotated $o_t$, sharing model weights across all rotations.

The system can be applied to three-dimensional rigid transformations. The transport function can be utilized to scale the system to three dimensional interactions. The system can use a multi-stage approach to extend into tasks which require three-dimensional placing. First, the three two-dimensional rigid transformation degrees-of-freedom can be addressed producing an estimated $\hat{\mathcal{T}}_{place}^{SE(2)}$. Then, the system can extend the cross-correlation transport operation. The system or method can use three channels over a two-dimensional rigid transformational space to regress the remaining rotational ($r_x$, $r_y$) and translational (z-height) degrees of freedom. The system can use two embedding models $\psi'$ and $\phi'$ identical to the embedding models $\psi$ and $\phi$ used for two-dimensional rigid transformation classification, but with three separate cross-correlations ($*_3$) from subsets of channels, and can add learnable nonlinearity after the cross-correlation via a three-headed MLP network, $$f(\cdot): r_x, r_y, z = f(\psi'(o_t[\mathcal{T}_{pick}])*_3\phi'(o_t)[\hat{\mathcal{T}}_{place}^{SE(2)}]).$$

The hybrid discrete/continuous approach of the system can afford accurate representation of complex multi-modal distributions in a two-dimensional rigid transformation space of an image, while the remaining degrees of freedom out-of-image-plane can be unimodal once conditioned on the multi-modal in-plane distribution. Furthermore, the approach can provide an attention mechanism to aid the model in precise continuous regression once an approximate two-dimensional rigid transformation alignment has been overlaid via the transport operation.

Figure 3:
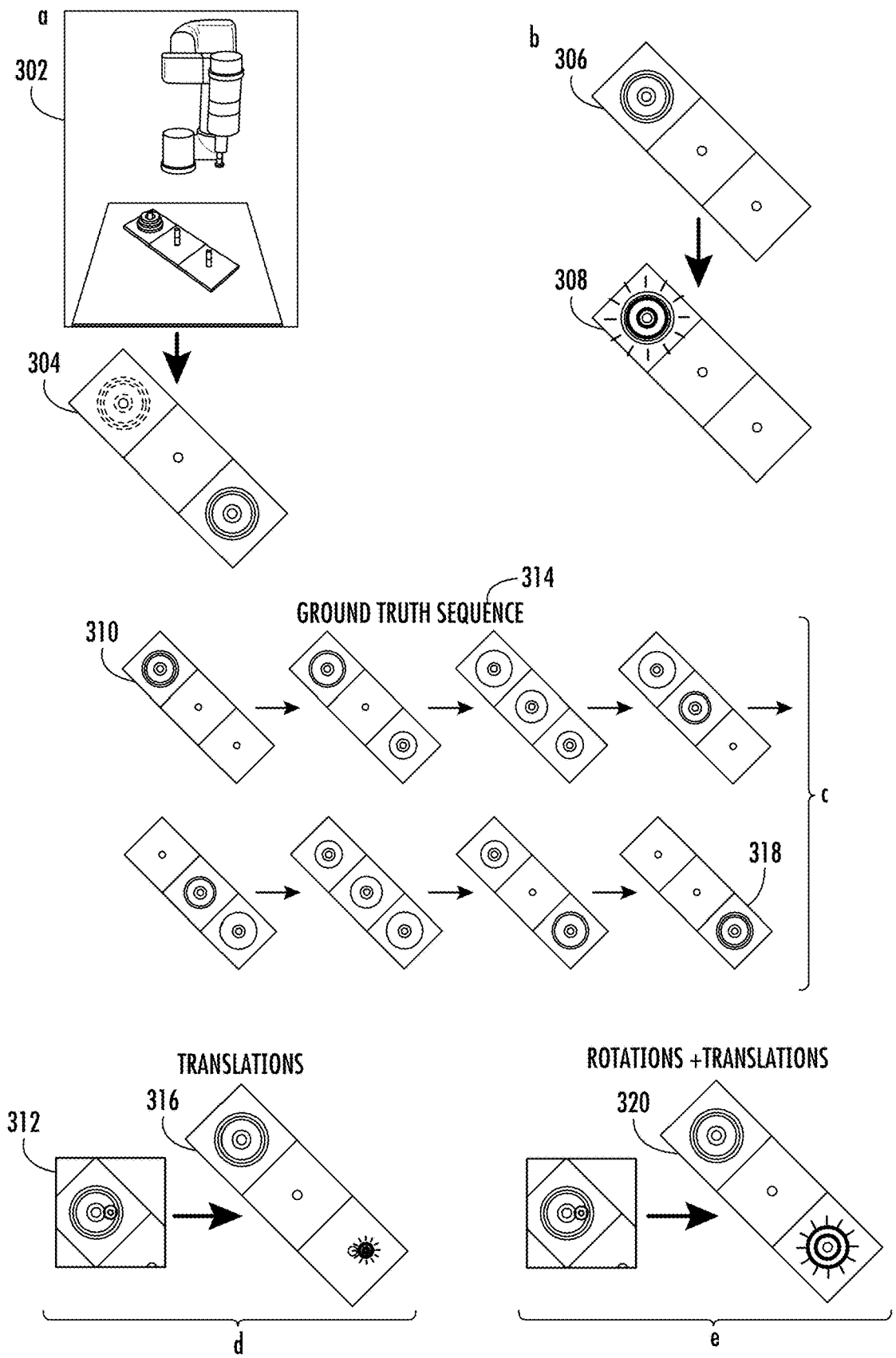
FIG. 3 depicts a block diagram of an example network process to train a system to determine actions for a robot according to example embodiments of the present disclosure.

An example of a possible application for the system can be the sequencing challenge of the Towers of Hanoi object pick-and-placing sequence (e.g., the example implementation in FIG. 3). The challenge of the Towers of Hanoi can require an actor to sequentially move three disks from a first tower to a third tower without placing a larger disk over a smaller disk. The disks can all be of a different color. Completing the task can require correctly sequencing seven pick-and-place actions. The system can condition actions for the sequencing task based on visual context clues (e.g., the next pick-and-place depends on the position, or absence due to occlusion, of observed objects in the scene). The system or method can be stateless. The system or method can learn the sequencing behaviors through visual feedback. The system can increase the receptive field of the embedding models to encompass most of the visual observation $o_t$. The system can utilize more memory to handle non-Markovian tasks.

The system or method can be used for tasks beyond pick-and-place actions. The system can be applied to other two-pose primitive tasks, including but not limited to: pushing and dragging. For example, the system can learn to sequentially rearrange a deformable rope such that the system determines a set of actions that can allow a robot or other actor to connect the two end points of an incomplete three-sided square. Another example application can include sequentially pushing piles of small objects into a desired target set using a spatula-shaped end effector. The system can learn other closed-loop behaviors using visual feedback to complete these tasks. The system can be applicable to rigid displacements and non-rigid placements like these examples. The system can be used to tap an object to start an object's movement towards a given location. The system can be used to determine a start and end position for a slicing or cutting motion. These example motion primitives can be combined to learn to perform more complex tasks as well.

The system can be configured utilizing various network architecture configurations.

An example implementation of the system's observational space can include a visual observation $o_t$, which can be an orthographic top-down view of a 0.5×1 m tabletop workspace, generated by fusing 480×640 RGB-D images captured with calibrated cameras using known intrinsics and extrinsics. The top-down image $o_t$ can have a pixel resolution of 160×320. The pixels can represent a 3.125×3.125 mm vertical column of 3D space in the workspace. The image $o_t$ can contain both color (RGB) and scalar height-from-bottom (H) information. Access to both color and height values can enable the deep models to learn features that are rich in both visual texture and geometric shape. It will be appreciated that other sizes of workspace, RGB-D images, and top-down images may alternatively be used.

An example embodiment of the system's first pose determination feature being used as a picking model can include a single feed-forward fully convolutional neural network that can take visual observation $o_t \in \mathbb{R}^{H \times W \times 4}$ as input and can output dense pixel-wise values that can correlate with picking success: $V_{pick} \in \mathbb{R}^{H \times W} = \text{softmax}(Q_{pick}((u, v)|o_t))$. The picking model can be an hourglass encoder decoder architecture. For example, a 43-layer residual network (ResNet) with 12 residual blocks and 8-stride (3 2-stride convolutions in the encoder and 3 bilinear-upsampling layers in the decoder), followed by image-wide softmax may be used. Each convolutional layer after the first can be equipped with dilation and interleaved with ReLU activations before the last layer. The use of 8-stride can provide balance between maximizing receptive field coverage per pixel prediction, while minimizing loss of resolution in the latent mid-level features of the network. It will be appreciated that other network structures may alternatively be used.

An example embodiment of the system's first pose determination feature being used as a placing model can use a two-stream feed-forward fully convolutional neural network that can take the visual observation $o_t \in \mathbb{R}^{H \times W \times 4}$ as input and can output two dense feature maps: query features $\psi(o_t) \in \mathbb{R}^{H \times W \times d}$, and key features $\phi(o_t) \in \mathbb{R}^{H \times W \times d}$, where d can be the feature dimensionality. The placing model can share a similar hourglass encoder decoder architecture as a correlating picking model. For example, each stream can use an 8-stride 43-layer ResNet. The system can use the ResNet without non-linear activations in the last layer. A partial crop $\psi(o_t[\mathcal{T}_{pick}]) \in \mathbb{R}^{c \times c \times d}$ of query features with size c centered around $\mathcal{T}_{pick} = \text{argmax} V_{pick}$ can be transformed by $\Delta\tau$ (which covers the space of possible placement configurations), then cross-correlated with the key feature map $\phi(o_t)$ to output dense pixel-wise values that correlate with placing success: $V_{place} \in \mathbb{R}^{H \times W \times k} = \text{softmax}(Q_{place}(\Delta\tau|o_t, \mathcal{T}_{pick}))$, where $\Delta\tau$ can be discretized into k=36 angles (multiples of 10°). The translation and rotation $\Delta\tau$, which can give the highest correlation with the partial crop, via $\psi(o_t[\mathcal{T}_{pick}])*\phi(o_t)[\Delta\tau]$, gives $\mathcal{T}_{place} = \text{argmax} V_{place}$. In some implementations, the system can implement the operation with highly optimized matrix multiplication, where the crop is flattened. In some implementations, the system can implement the operation as a convolution, where the crop is the convolving kernel. It will be appreciated that other network structures may alternatively be used.

The system can be trained with the use of ground truth data and various loss functions. For example, during training, sample observation-action pairs from the dataset $\mathcal{D}$ can be uniformly taken, from which each action $a_t$ can be unpacked into two training labels: $\mathcal{T}_{pick}$ and $\mathcal{T}_{place}$, used to generate binary one-hot pixel maps $Y_{pick} \in \mathbb{R}^{H \times W}$ and $Y_{place} \in \mathbb{R}^{H \times W \times k}$, respectively. The training loss can be the cross-entropy between the one-hot pixel maps and the outputs of the picking and placing models, for example $\mathcal{L} = - \mathbb{E}_{Y_{pick}} [\log V_{pick}] - \mathbb{E}_{Y_{place}} [\log V_{place}]$. While the training can only have labels for a single pixel per dense probability map, gradients can be passed to all other pixels via image-wide softmax.

The system or method can be applied or taught using a variety of transformation groups. The system can utilize lie groups, including but not limited to: SE(2), SO(2), and SE(3).

Figure 2:
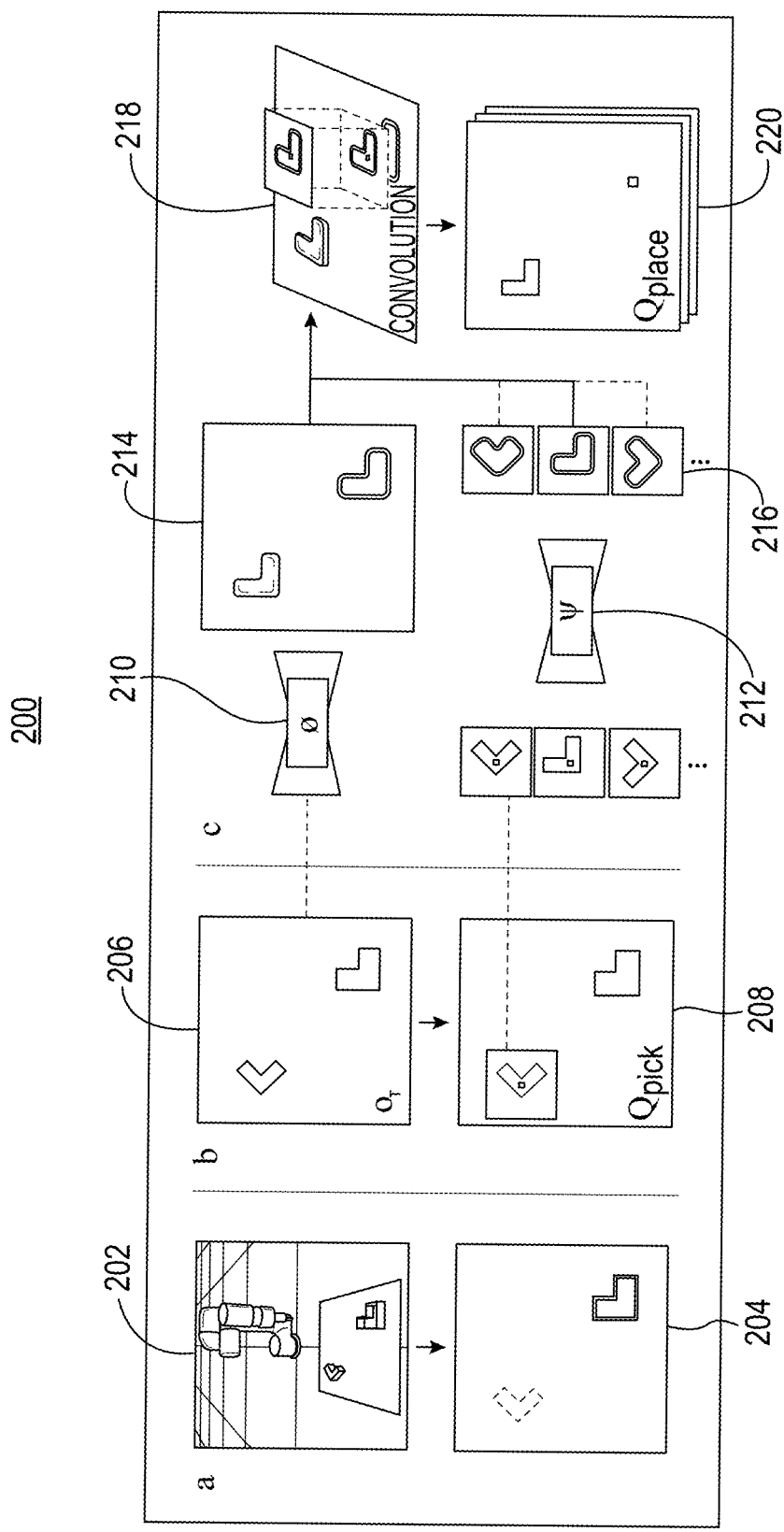
FIG. 2 depicts a block diagram of an example network process to determine actions for a robot according to example embodiments of the present disclosure.

FIG. 2 depicts an illustration of an example action determination model 200 according to example embodiments of the present disclosure. In some implementations, the action determination model 200 is trained to receive a set of input data 206 descriptive of an observational area and, as a result of receipt of the input data 206, provide output data 208 and 220 that include a first pose and a second pose. Thus, in some implementations, the action determination model 200 can include an object manipulation model that is operable to move an object from an initial point to a determined end point.

FIG. 2 depicts an example application of the system or method of action determination. The depicted action can involve a pick-and-place action, a push action, a drag action, or the like. The environment 202 may include a robot with an end effector, an object, and an end/target point for the object. The object can be in any shape, but for this embodiment, the object is in the shape of an uppercase "L." The object and the end point may be within an observation scene inside the environment. The observation scene may be observed by one or more sensors. Moreover, the one or more sensors may be cameras, LiDAR sensors, or another form of surveying sensor. In this embodiment, the sensor intakes data on the scene to generate observation data 206. The observation data may be input into the system. The system may have a target goal of picking-and-placing the object with a set end point 204.

In the illustrated example, the observation data 206 is processed by an action model to generate a distribution of successful first actions 208. Based on the distribution of successful first actions 208, the system determines a first pose for the robot.

The observation data 206 is then processed by a first embedding model 210. In this implementation, the first embedding model 210 outputs one or more first feature embeddings 214.

In this embodiment, the observation data 206 may also be cropped and rotated to produce a plurality of cropped and rotated data sets. The plurality of cropped and rotated data sets may be processed by a second embedding model 212 to generate a plurality of second feature embeddings 216.

The one or more first feature embeddings 214 and the plurality of second feature embeddings 216 may be compiled to provide a plurality of second possible poses 218. In the illustrated example, the system used deep feature template matching to determine the success of each possible second pose. The system generates a distribution of successful second poses 220. The system then selected a second pose from the distribution of successful second poses 220.

The action determination model 200 may then be used to direct the robot of environment 202 to complete a first pose and a second pose, where the first pose is a pose in which the end effector of the robot comes in contact with the object, and the second pose is a pose in which the object is placed in an end position with the aid of the end effector of the robot.

FIG. 3 depicts an illustration of an example action determination model 300 according to example embodiments of the present disclosure. The action determination model 300 is similar to action determination model 200 of FIG. 2 except that action determination model 300 further includes a set of ground truth data to evaluate and modify the parameters of the action determination model. FIG. 3 depicts an example implementation of the training system. The depicted implementation can involve seven steps to complete the goal task.

The action determination model 300 may be taught the seven-step task for completing the "Tower of Hanoi" sequence. The system may have been taught the specific order or specific rules that allow for completion of the task. The action determination model 300 may include an environment 302 with a robot and an observation scene, in which a "Tower of Hanoi" set is inside the observation scene. One or more sensors may generate observation data 306 based on the scene. The action determination model may then be used to process the observation data 306 to complete the goal task 304.

In the illustrated example, the first step of the action determination model involves obtaining the observation data 306. Once the observation data 306 is obtained, the observation data 306 is processed by an action model to generate a distribution of successful possible first actions 308. The system then selects an argmax for that model to determine the first action 312.

In this embodiment, the observation data 306 and the first action 312 are then processed by a first embedding model and a second embedding model to generate a first feature embedding 316 and a second feature embedding. The first feature embedding 316 may relate to a plurality of possible translations. The second feature embedding may relate to a plurality of possible rotations. The first feature embedding and the second feature embedding are then convolved, and the convolved feature embeddings 320 are then used for deep feature template matching. Based on the deep feature template matching, the system may determine a distribution of successful possible second actions. The system may select one of the possible second actions as a second action for the robot. The action determination model 300 may be ran iteratively in order to complete the full sequence 314.

The action determination model 300 may be trained using ground truth data 314. The ground truth data may include a starting image 310, an end point image 318, and images for each placement in between. For the seven-step "Tower of Hanoi" depicted in the illustrated example, the ground truth data 314 includes eight images. Each step may be processed to generate one-hot ground truth pixel maps for each step. For completing the first step of the "Tower of Hanoi," one-hot pixel maps are generated for the ground truth first action and ground truth second action (i.e. a picking action and a placing action). The generated first ground truth pixel map and the second ground truth pixel map can then be compared to the determined first action and determined second action to evaluate the action determination model. In response to the evaluation, the parameters of the action model, the first embedding model, or the second embedding model may be modified. The training process may be run iteratively to provide for more accurate results.

In some implementations, the action determination model 300 may use ground truth data 314 to aid in completion of a task. The ground truth data 314 may be processed by a third embedding model to generate a third feature embedding. The third feature embedding may be used to provide more accurate results for the deep template matching.

Figure 4:
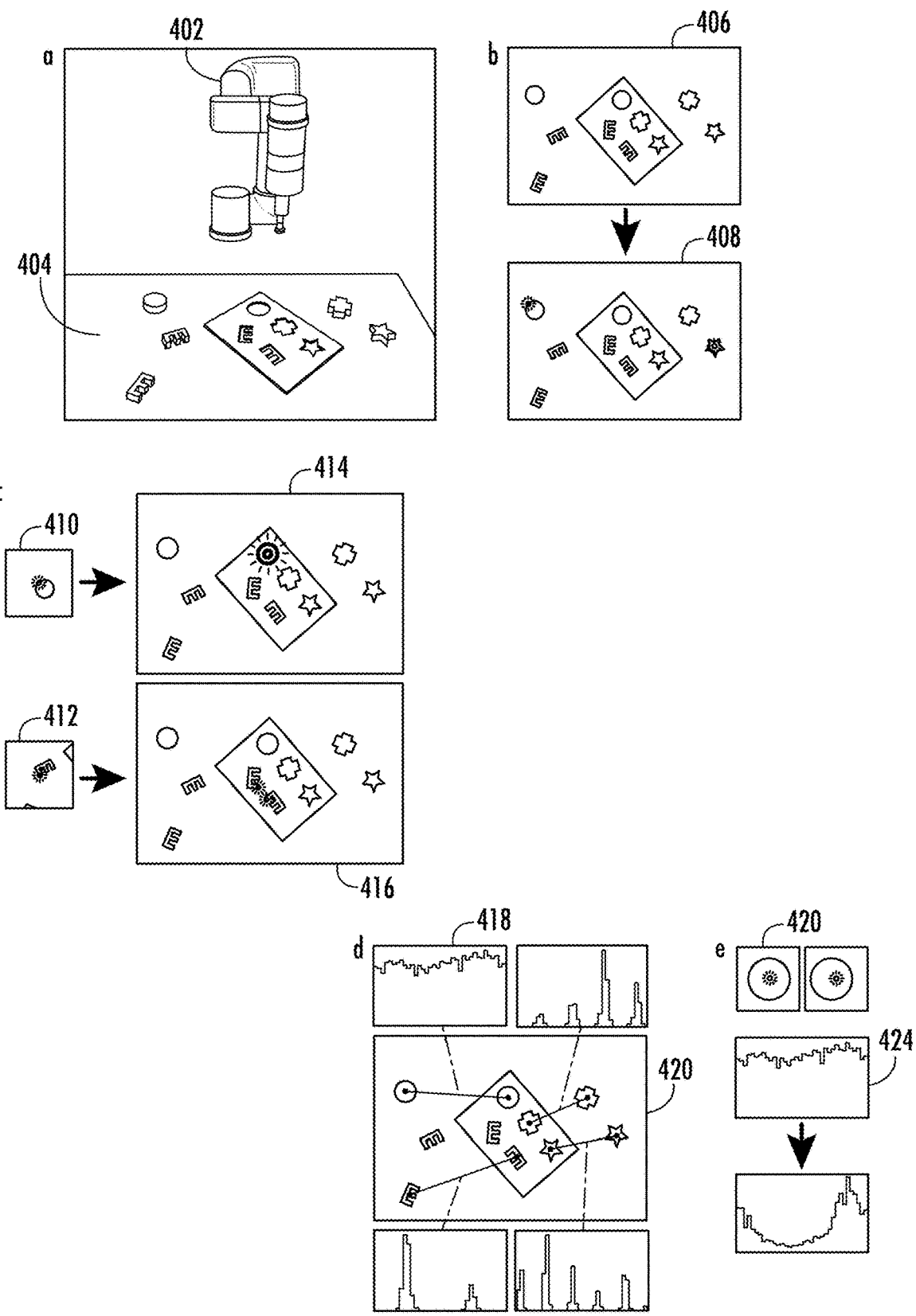
FIG. 4 depicts a block diagram of an example network process to determine actions for a robot according to example embodiments of the present disclosure.

FIG. 4 depicts an example application of the system or method of action determination. The depicted implementation can involve the use of a multi-modal policy to complete different actions for the different shapes.

The action determination model 400 may be used to complete several tasks in the same environment 402 involving different objects at different locations in the environment 402. In this implementation, the observation area 404 includes five objects with four different shapes. The observation area 404 also contains five destinations in four different shapes corresponding to the objects. The action determination model 400 may be used to pick-and-place each object into a corresponding destination. The action determination model may be run iteratively to complete the task.

The action determination model may include obtaining observation data 406, which may be processed by a first action model to determine a first action 408 on one of the objects. For each respective object at each respective location on each of the objects, the second action may differ due to the shape of the object and the shape of the destination. For example, if the first action is a picking action on the edge of the circular object 410, then the action determination model may produce a distribution of possible second actions, in which the distribution is a circular distribution in the circle destination 414. Another example may involve the first action being a picking action on the leg of one of the "E" shaped objects 412. The action determination model may generate a distribution consisting of two points, where each point is in one of the "E" shaped destinations 416.

Furthermore, the action determination model may be used to determine a first action (e.g., a picking action or contact action) and a second action (e.g., a placing action or release action) for each respective object 420.

Moreover, FIG. 4 displays success distributions 418 for rotational placement of each shape. The symmetry of each object contributes to the distribution outcome. For example, a circle selected at a center being placed in a circular destination may have a uniform distribution from 0 to 2 π. However, the square and clover shapes may have four individual maximums of nearly uniform magnitude when the selection point is the center. Shapes lacking any form of symmetry may only produce a singular maximum of statistical significance, when the destination is of the same shape.

Similarly, changing the selection point or the translation point may change the distribution of success 422 and 424.

Example Methods

Figure 5:
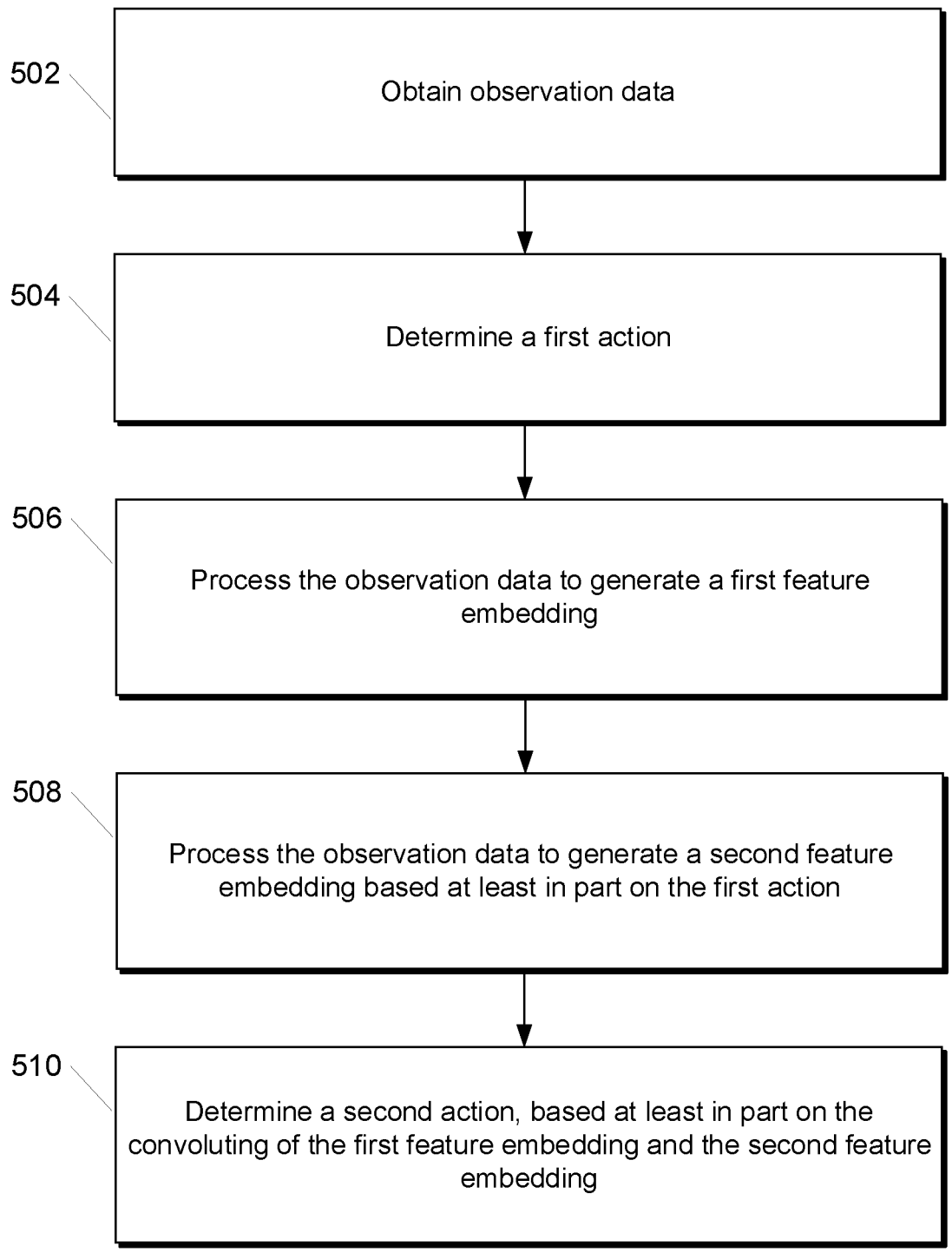
FIG. 5 depicts a flow chart of an example method for determining actions for a robot according to example embodiments of the present disclosure.

FIG. 5 depicts a flow chart diagram of an example method to perform according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a computing system may obtain observation data. The observation data may be image data, LiDAR point cloud data, or another form of data. Moreover, the data can be obtained from one or more sensors located around the observation scene. The observation data may include data on the environment. Moreover, the environment may include one or more objects to be acted on.

At 504, the computing system may determine a first action. The determination of a first action may include processing the observation data with a first action model. The first action model may use pixel mapping to generate a distribution of successful possible first actions. The system may use the distribution to select a first action. In some embodiments, the first action may be an argmax for the model function.

At 506, the computing system may process the observation data to determine a first feature embedding. The observation data may be processed by a first embedding model to generate the first feature embedding. In some implementations, the first feature embedding may be a plurality of possible robot movement translations. Moreover, the first embedding model may be a fully convolutional neural network.

At 508, the computing system may process the observation data to generate a second feature embedding based at least in part on the first action. The observation data may be processed by a second embedding model to generate the second feature embedding. The second feature embedding may be descriptive of a plurality of possible robot movement rotations. In some implementations, the second embedding model may be a fully convolutional neural network.

In some implementations, the first embedding model and the second embedding model may process the observation data with respect to the first action.

At 510, the computing system may determine a second action. In some implementations, the second action can be determined based at least in part on the convolving of the first feature embedding and the second feature embedding. The determination may include deep feature template matching. The convolution of the first feature embedding and the second feature embedding may be used to generate a distribution of possible second actions, in which the second action may be chosen from the distribution.

Figure 6:
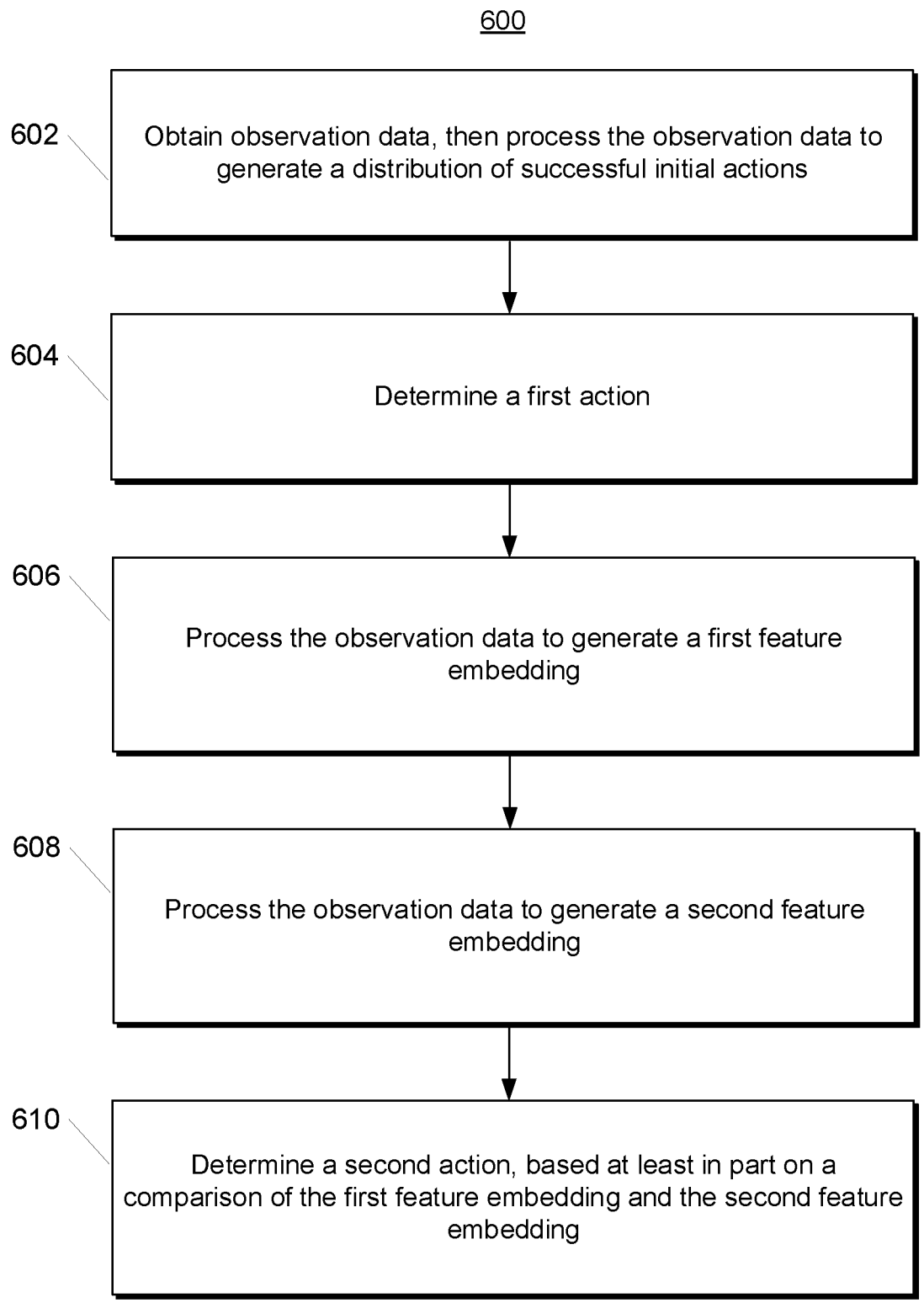
FIG. 6 depicts a flow chart of an example method for determining actions for a robot according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system may obtain observation data, then process the observation data to generate a distribution of successful initial actions. The observation data may be processed by an action model, and the observation data may include information on the environment a robot is working on. In some implementations, the action model may be processing the data on a pixel by pixel basis.

At 604, the computing system may determine a first action. The determination may include selecting a first action from the distribution of successful initial actions. The selection may be based on whether a point is a local maximum. Furthermore, the first action may be a picking action, in which the action brings the robot end effector to contact an item and pick-up the item.

At 606, the computing system may process the observation data to generate a first feature embedding. The processing may be completed by a first embedding model, and in some implementations, the first embedding model may be a fully convolutional neural network.

At 608, the computing system may process the observation data to generate a second feature embedding. The processing may be completed by a second embedding model, and in some implementations, the second embedding model may be a fully convolutional neural network.

At 610, the computing system may determine a second action, based at least in part on a comparison of the first feature embedding and the second feature embedding. The determination of the second action may be further dependent on the first action. Moreover, the second action may be determined by deep feature template matching using the data generated by the comparison of the first feature embedding and the second feature embedding. In some implementation, the second action may be a placing action, in which the action releases the item contacted by the first action. In some implementations, the second action may place an item at a desired location. In some implementations, a machine-learned model can be used to generate the second action based on the first feature embedding and the second feature embedding.

Figure 7:
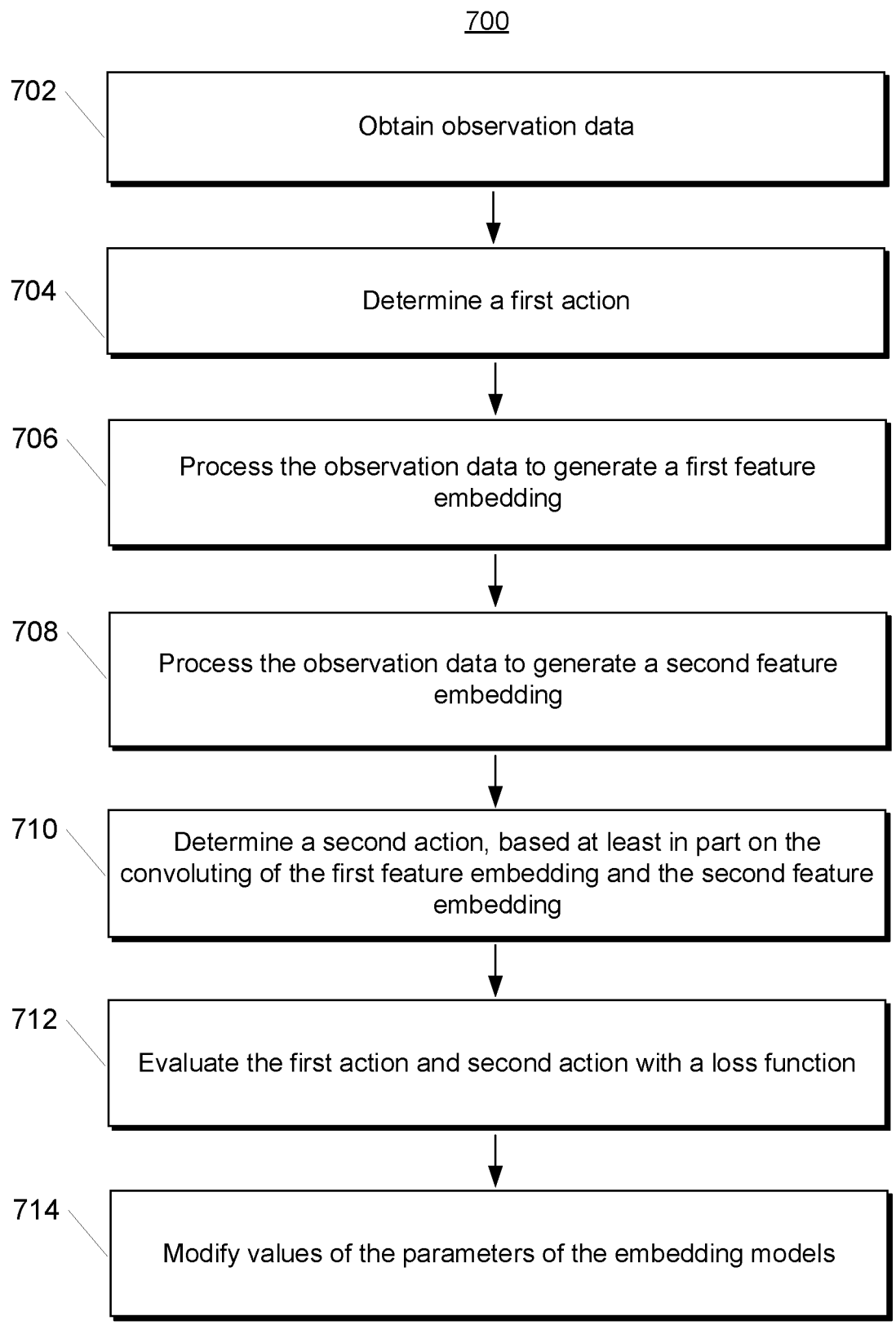
FIG. 7 depicts a flow chart of an example method for training a system to determine actions for a robot according to example embodiments of the present disclosure.

FIG. 7 depicts a flow chart diagram of an example training method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system may obtain observation data. The observation data may be a spatially-consistent representation to allow for the exploitation of equivariance principles. The observation data can include data observant of an environment. The environment may include one or more items for robot manipulation.

At 704, the computing system may determine a first action. The determination of a first action may be based on the processing of the observation data by an action model to generate a distribution of successful initial actions. The distribution of successful pick actions may include one or more maxima including an argmax with respect to the action model's function. The first action may be determined by selecting a maxima or even the argmax of the action model's function.

At 706, the computing system may process the observation data to generate a first feature embedding. The processing may be completed by a first embedding model in which the first embedding model processes the observation data to generate the first feature embedding. The first feature embedding can include a possible translation of an item with respect to the first action. The first embedding model may generate a plurality of first feature embeddings with varying possible translations.

At 708, the computing system may process the observation data to generate a second feature embedding. The processing may be completed by a second embedding model in which the second embedding model processes the observation data to generate the second feature embedding. The second feature embedding can include a possible rotation of an item with respect to the second action. The second embedding model may generate a plurality of second feature embeddings with varying possible rotations. The processed observation data may be cropped and rotated observation data. The cropped and rotated observation data may have been generated by cropping the observation data fixated on a set of pixels of interest. The cropped data may then be duplicated and rotated to generate a plurality of cropped and rotated observation data to be processed.

At 710, the computing system may determine a second action, e.g., based at least in part on the convolving of the first feature embedding and second feature embedding or based at least in part on more complex, learned model processing. The determination of the second action may be determined by taking the convolution of the first feature embedding and the second feature embedding and completing deep template matching to determine which secondary actions would be successful. The second action can be selected from the determined successful secondary actions.

At 712, the computing system may evaluate the first action and second action with a loss function. The evaluation may include comparing the first action and second action against ground truth actions using a loss function. The ground truth actions may be processed to generate one-hot ground truth pixel maps to compare the determined actions against. For three-dimensional manipulations, the loss function may be a Huber loss.

At 714, the computing system may modify values of the parameters of the embedding models. The modification of the action model, first embedding model, or second embedding model may be completed in response to the evaluation of the first action and second action. The evaluation and modification may be utilized to train the action determination model. The model may be trained through iterative training techniques.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for generating actions for robots, the method comprising:
obtaining observation data, wherein the observation data comprises data descriptive of an environment prior to a first action of a robot;
determining the first action for the robot based at least in part on the observation data;
processing the observation data descriptive of the environment prior to the first action of the robot with a first embedding model to generate a first feature embedding;
processing the observation data descriptive of the environment prior to the first action of the robot with a second embedding model to generate a second feature embedding, wherein the second embedding model is conditioned upon the first action; and determining, based at least in part on a comparison of the first feature embedding with the second feature embedding, a second action for the robot.

2. The computer-implemented method of claim 1, further comprising controlling the robot to cause the robot to perform the first action and the second action.

3. The computer-implemented method of claim 1, wherein the first action comprises the robot contacting an object.

4. The computer-implemented method of claim 1, wherein the observation data comprises image data.

5. The computer-implemented method of claim 1, wherein the observation data comprises Light Detection and Ranging (LiDAR) point cloud data.

6. The computer-implemented method of claim 1, wherein the first action comprises a change in a pose of the robot.

7. The computer-implemented method of claim 1, wherein each of the first embedding model and the second embedding model comprises a fully convolutional neural network.

8. The computer-implemented method of claim 1, wherein determining the first action for the robot comprises:
generating, based on the observation data and using a first machine-learned action value model, a first probability distribution for the first action; and
selecting as the first action an action that has a maximum value in the first probability distribution.

9. The computer-implemented method of claim 8, wherein the first probability distribution comprises one or more points indicating a respective probability that the one or more points is a start location for an object manipulation.

10. The computer-implemented method of claim 1, wherein determining, based at least in part on the comparison of the first feature embedding with the second feature embedding, the second action for the robot comprises:
convolving the second feature embedding over the first feature embedding to generate a second probability distribution; and
selecting as the second action an action that has a maximum value in the second probability distribution.

11. The computer-implemented method of claim 1, wherein processing the observation data with the second embedding model to generate the second feature embedding comprises:
rotating and cropping the observation data to generate a plurality of rotated cropped data samples; and
processing the plurality of rotated cropped data samples with the second embedding model to respectively generate a plurality of second feature embeddings.

12. The computer-implemented method of claim 1, wherein obtaining the observation data comprises:
obtaining raw observation data;
unprojecting the raw observation data into three-dimensional space; and
rendering the unprojected data into an orthographic representation of the environment, wherein the orthographic representation of the environment is used as the observation data.

13. The computer-implemented method of claim 1, wherein the observation data, the first feature embedding, and the second feature embedding comprise three-dimensional data.

14. The computer-implemented method of claim 1, wherein determining the second action for the robot comprises processing the first feature embedding and the second feature embedding with a second machine-learned value action model.

15. The computer-implemented method of claim 1, further comprising:
obtaining a set of goal image data; and
processing the set of goal image data with a third embedding model to generate a third feature embedding;
wherein determining the second action for the robot comprises determining the second action based at least in part on the first feature embedding, the second feature embedding, and the third feature embedding.

16. A computer system, comprising:
one or more processors;
one or more non-transitory computer readable media that collectively store instructions that, when executed by the one or more processors, cause the computing system to perform operations, the operations comprising:
obtaining observation data, wherein the observation data comprises data descriptive of an environment prior to a first action of a robot;
determining the first action for the robot;
processing the observation data descriptive of the environment prior to the first action of the robot with a first embedding model to generate a first feature embedding;
processing the observation data descriptive of the environment prior to the first action of the robot with a second embedding model to generate a second feature embedding, wherein the second embedding model is conditioned upon the first action;
determining, based at least in part on a comparison of the first feature embedding with the second feature embedding, a second action for the robot;
evaluating a loss function that compares one or both of the first action and the second action to one or both of a first ground truth action and a second ground truth action; and
modifying one or more values of one or more parameters of one or both of the first embedding model and the second embedding model based at least in part on the loss function.

17. The computer system of claim 16, wherein evaluating the loss function comprises:
generating a first one-hot ground truth pixel map based on the first ground truth action and a second one-hot ground truth pixel map based on the second ground truth action, wherein the first one-hot ground truth pixel map comprises a first plurality of pixels that have respective binary values that indicate a ground truth location for the first action within the environment, and wherein the second one-hot ground truth pixel map comprises a second plurality of pixels that have respective binary values that indicate a ground truth location for the second action within the environment; and
comparing the first action with the first one-hot ground truth pixel map and the second action with the second one-hot ground truth pixel map.

18. The computer system of claim 17, wherein the loss function comprises a cross entropy loss, and wherein comparing the first action with the first one-hot ground truth pixel map and the second action with the second one-hot ground truth pixel map comprises evaluating the cross entropy loss on a pixel by pixel basis.

19. A robotic device, comprising one or more non-transitory computer-readable media that collectively store instructions that, when executed by one or more computing dvices, cause the one or more computing devices to perform operations, the operations comprising:
- obtaining observation data, wherein the observation data comprises data descriptive of an environment prior to a first action of the robotic device;
- determining the first action for the robotic device;
- processing the observation data descriptive of the environment prior to the first action of the robotic device with a first embedding model to generate a first feature embedding;
- processing the observation data descriptive of the environment prior to the first action of the robotic device with a second embedding model to generate a second feature embedding, wherein the second embedding model is conditioned upon the first action;
- determining, based at least in part on a comparison of the first feature embedding with the second feature embedding, a second action for the robotic device; and
- performing, by the robotic device, the first action and the second action.

20. The robotic device of claim 19, wherein the observation data comprises spatially consistent data.

* * * * *